United States Patent [19]
Maglica

[11] Patent Number: 5,113,326
[45] Date of Patent: May 12, 1992

[54] MINIATURE FLASHLIGHT

[75] Inventor: Anthony Maglica, Anaheim, Calif.

[73] Assignee: Mag Instrument, Inc., Ontario, Calif.

[21] Appl. No.: 719,156

[22] Filed: Jun. 21, 1991

Related U.S. Application Data

[63] Continuation-in-part of Ser. No. 553,977, Jul. 16, 1990, which is a continuation of Ser. No. 356,361, May 23, 1989, Pat. No. 4,942,505, which is a continuation of Ser. No. 222,378, Jul. 19, 1988, Pat. No. 4,899,265, which is a continuation of Ser. No. 34,918, Apr. 6, 1987, abandoned, which is a continuation of Ser. No. 828,729, Feb. 11, 1986, Pat. No. 4,658,336, which is a continuation of Ser. No. 648,032, Sep. 6, 1984, Pat. No. 4,577,263.

[51] Int. Cl.$^5$ .............................................. F21V 31/00
[52] U.S. Cl. .................................... 362/158; 362/188; 362/205; 362/267; 137/859

[58] Field of Search ............... 362/158, 188, 202, 207, 362/208, 267; 137/859; 220/DIG. 27, 913

[56] References Cited

U.S. PATENT DOCUMENTS 4,530,039  7/1985  Shin-Shi ........................... 362/267 X
5,003,440  3/1991  Maglica ............................... 362/158

Primary Examiner—Stephen F. Husar
Attorney, Agent, or Firm—Lyon & Lyon

[57] ABSTRACT

A miniature flashlight having a barrel, a tail cap, a head assembly and means for holding a miniature lamp bulb and providing an interruptible coupling to dry cell batteries retained within the barrel. One way valves positioned at seal locations in association with passageways to allow venting of overpressure with the interior volume of the flashlight.

15 Claims, 7 Drawing Sheets

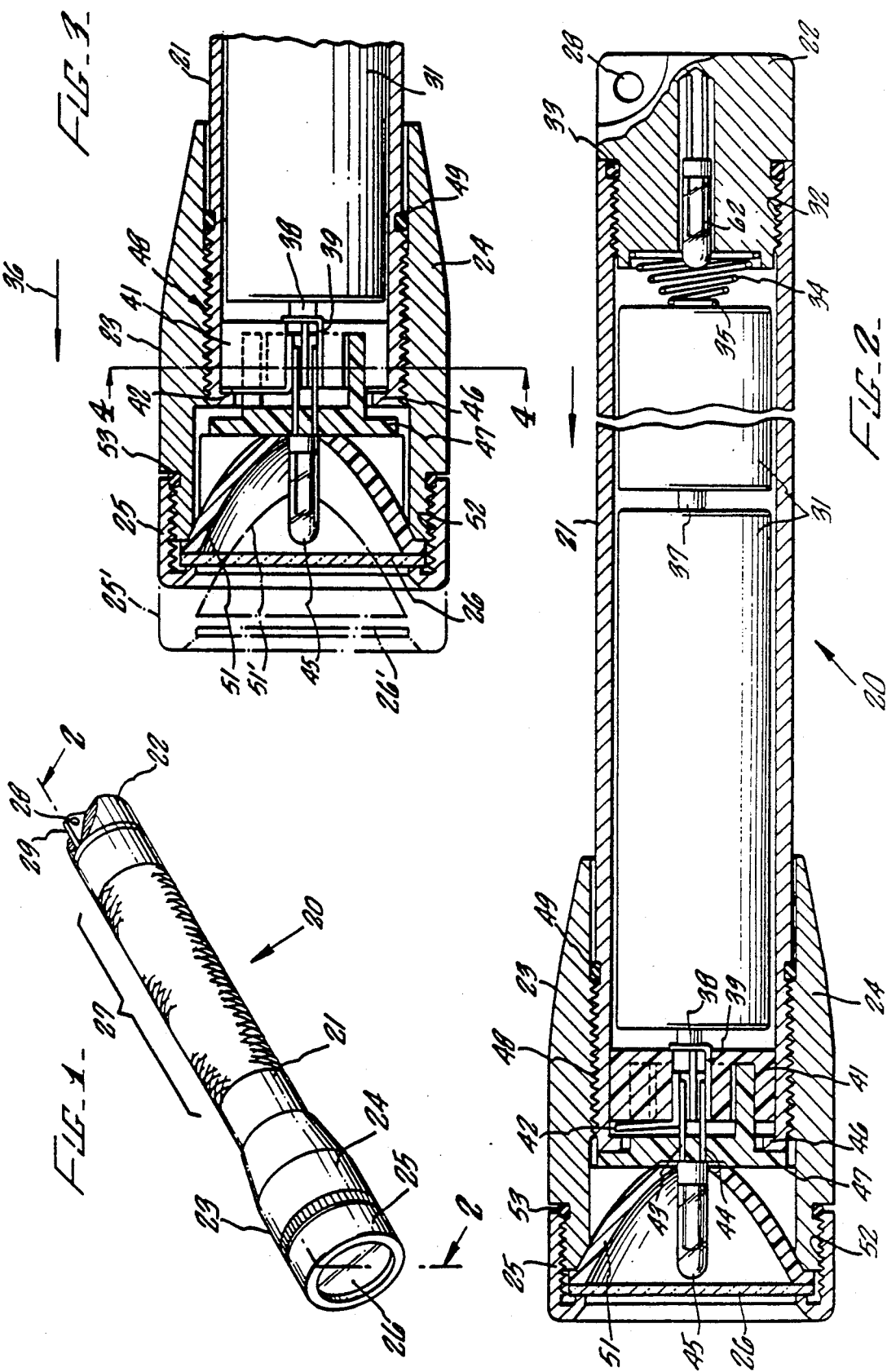

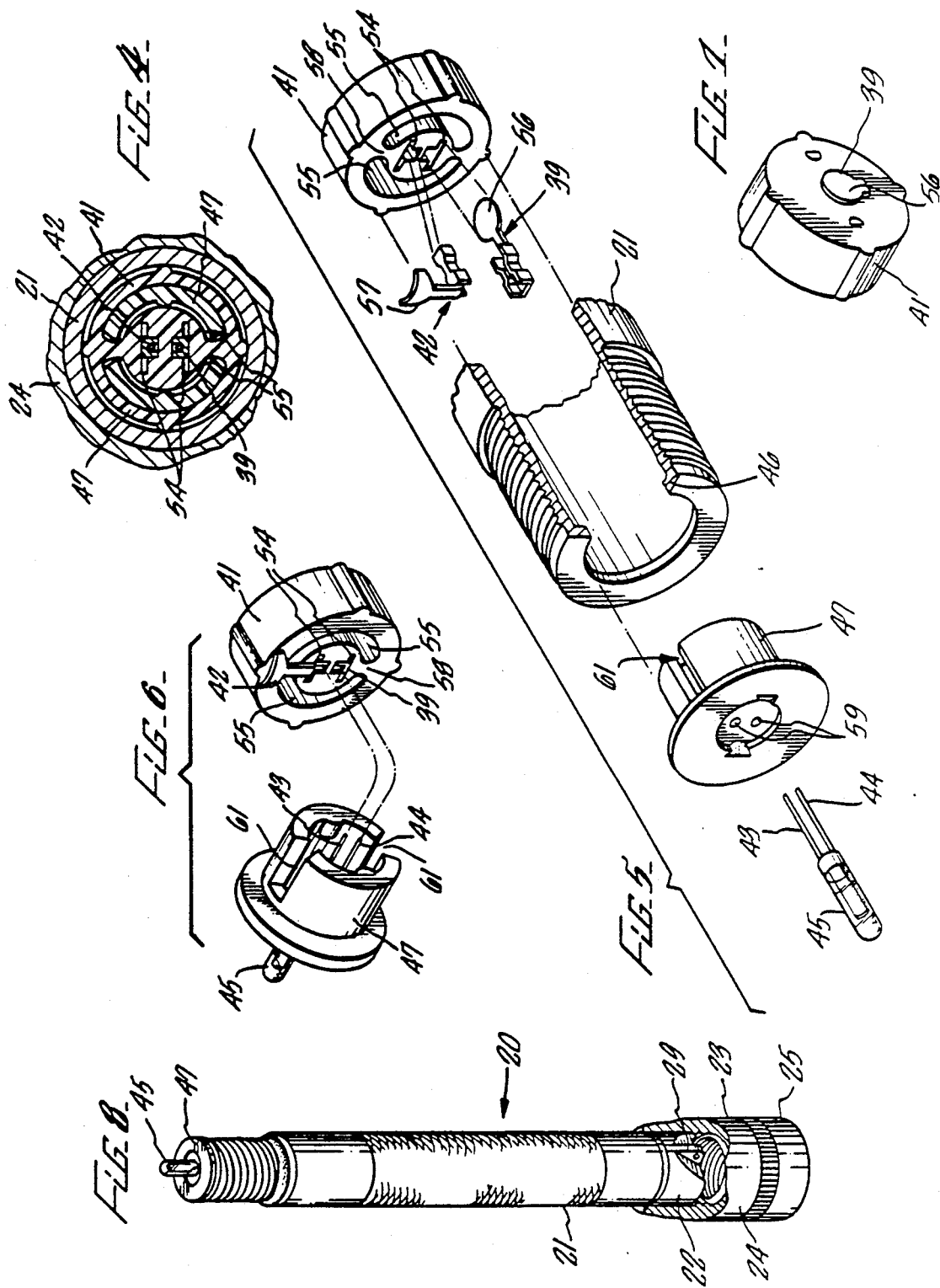

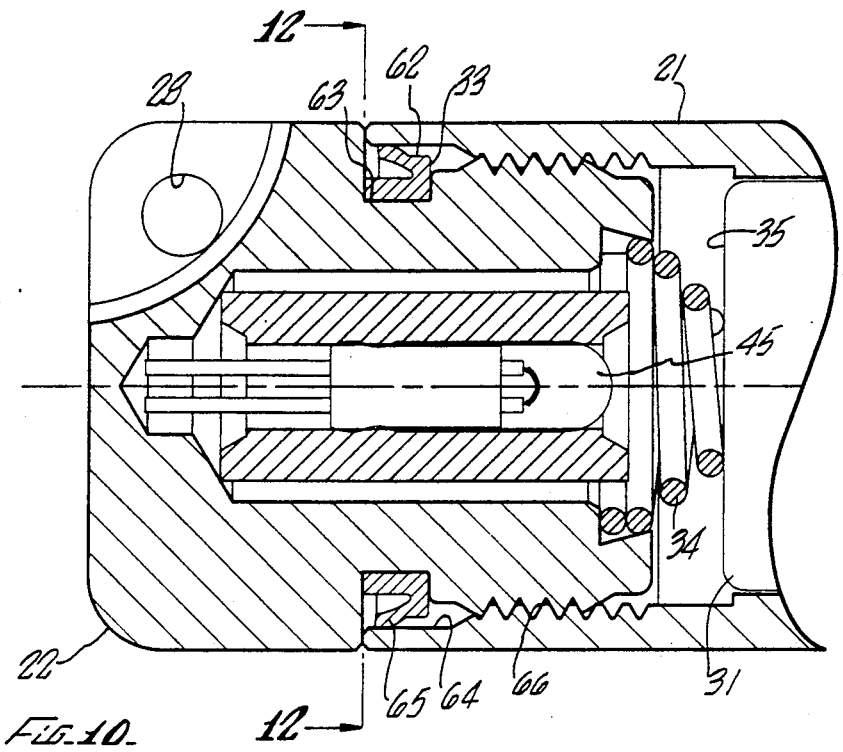
FIG. 10.
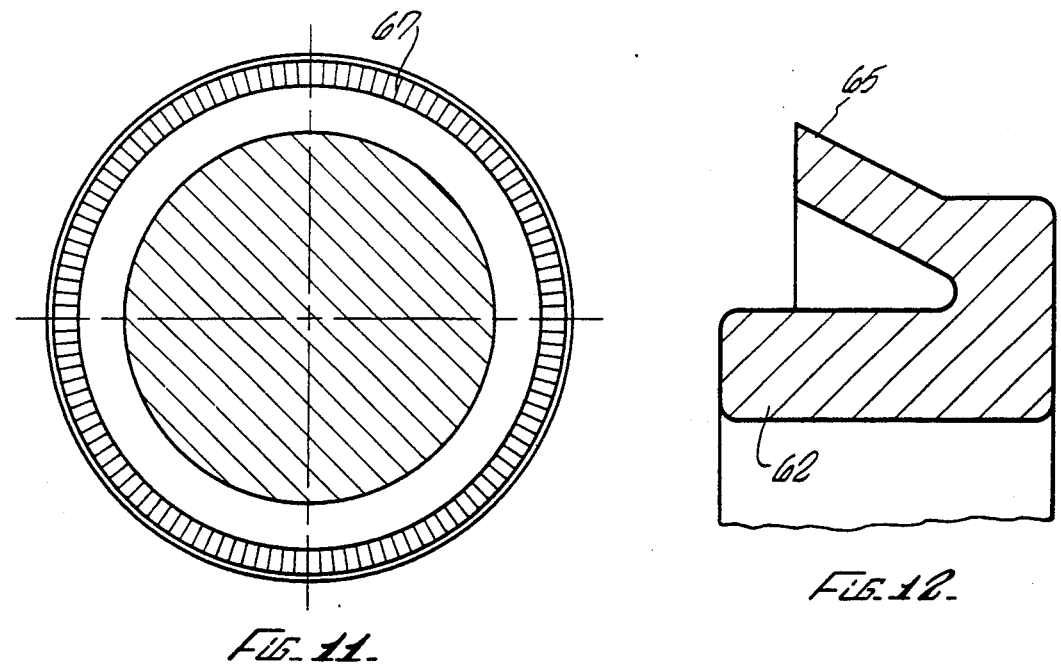
FIG. 11.
FIG. 12.

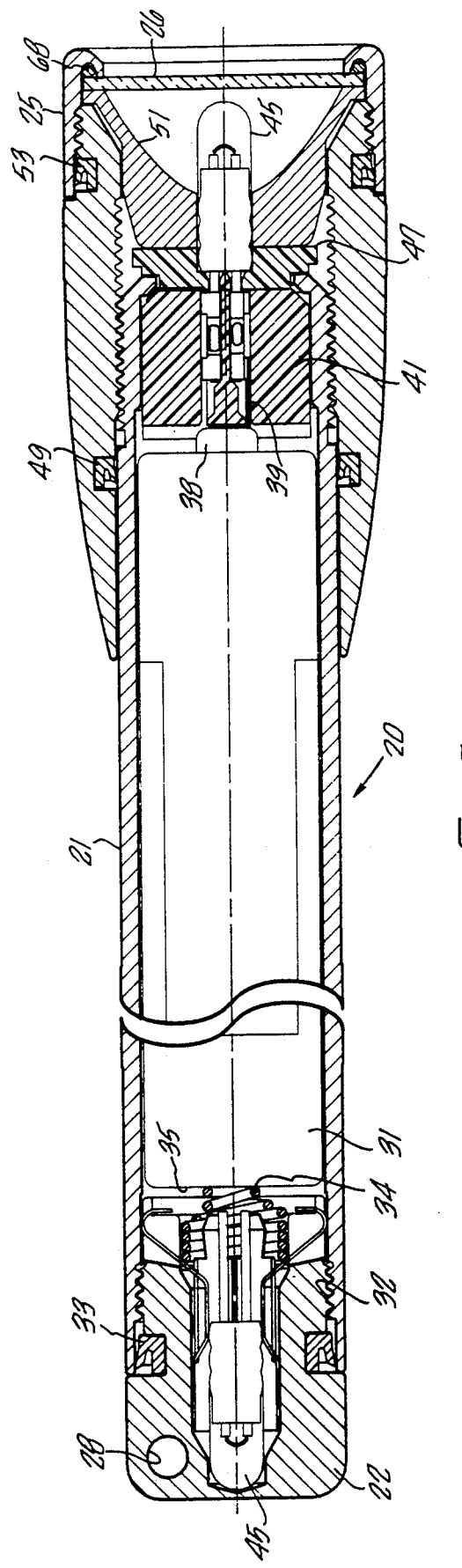

MINIATURE FLASHLIGHT

This is a continuation in part of co-pending application Ser. No. 553,977, filed on Jul. 16, 1990, copending; which is a continuation of application Ser. No. 356,361, filed on May 23, 1989, now U.S. Pat. No. 4,942,505; which is a continuation of application Ser. No. 222,378, filed on Jul. 19, 1988, now U.S. Pat. No. 4,899,265; which is a continuation of Ser. No. 034,918, filed on Apr. 6, 1987, now abandoned, which is a continuation of application Ser. No. 828,729, filed Feb. 11, 1986, now U.S. Pat. No. 4,658,336, which is a continuation of application Ser. No. 648,032, filed Sep. 6, 1984, now U S. Pat. No. 4,577,263. The foregoing documents are incorporated herein by reference.

BACKGROUND OF THE INVENTION

The field of the present invention is flashlights.

Flashlights of varying sizes and shapes are well-known in the art. In particular, certain of such known flashlights utilize two or more dry cell batteries, carried in series in a cylindrical tube serving as a handle for the flashlight, as a source of electrical energy. Typically, an electrical circuit is established from one electrode of the battery through a conductor to a switch, then through a conductor to one electrode of the lamp bulb. After passing through the filament of the lamp bulb, the electrical circuit emerges through a second electrode of the lamp bulb in electrical contact with a conductor, which in turn is in electrical contact with the flashlight housing. The flashlight housing provides an electrical conduction path to an electrical conductor, generally a spring element, in contact with the other electrode of the battery. Actuation of the switch to complete the electrical circuit enables electrical current to pass through the filament, thereby generating light which is typically focused by a reflector to form a beam of light.

The production of light from such flashlights has often been degraded by the quality of the reflector utilized and the optical characteristics of any lens interposed in the beam path. Moreover, intense light beams have often required the incorporation of as many as seven dry cell batteries in series, thus resulting in a flashlight having significant size and weight.

Efforts at improving such flashlights have primarily addressed the quality of the optical characteristics. The production of more highly reflective, well-defined reflectors, which may be incorporated within such flashlights, have been found to provide a more well-defined focus thereby enhancing the quality of the light beam produced. Additionally, several advances have been achieved in the light admitting characteristics of flashlight lamp bulbs.

Since there exists a wide variety of uses for hand-held flashlights, the development of the flashlight having a variable focus, which produces a beam of light having a variable dispersion, has been accomplished.

High quality flashlights are commonly sealed for protection from moisture and other harmful environmental elements. Proper sealing is most specifically achievable with machined metallic flashlights which employ nonpermeable materials and can be constructed with reliable sealed joints. Such flashlights which have variable focus through movement of the head toward and away from the flashlight barrel experience an expansion and contraction of the internal volume thereof which is unvented, resulting in internal pressure changes. Also as the temperature of the barrel changes, variation in pressure within the internal volume can also occur. These pressure changes are understood, at least theoretically, not to be substantial. However, in infrequent occurrences, pressure has built up in such devices. This is believed to be the result of outgassing from a defective battery.

Heretofore, flashlights have been known to include vent holes or simple imperfections in the manufacture which unintentionally create vent passages. Where moisture is considered to be a problem, such vent holes may include a moisture impervious diaphragm to allow the passage of air but not moisture into and out of the internal chamber of the flashlight. Such devices are believed to be less than optimum in that various harmful elements in gaseous form can be drawn into the internal volume of the flashlight. Further, such devices cannot resist substantial overpressure resulting from deep submersion or other equivalent conditions. The cross-sectional size of the passage can also result in problems with blockage.

SUMMARY OF THE INVENTION

The present invention is directed to a flashlight having improved characteristics. A high quality flashlight having a closed internal volume includes a one-way valve associated with a passage extending to atmosphere from the closed internal volume. Such an arrangement provides for the release of internal pressures within the flashlight and yet does not accommodate flow into the flashlight when the internal volume is closed. In this way, substantial overpressure is accommodated without breaching the integrity of the unit. With vacuum being limited in magnitude by its very nature, no provision is made for the release of such vacuum. In this way, introduction of harmful elements is avoided. Membrane mechanisms not capable of resisting substantial overpressure are also avoided.

In another aspect of the present invention, a circumferential resilient one-way valve is contemplated which defines an extended valving area. Blockage through the valve is avoided in this way. Multiple passages through threads and splines between flashlight components also can contribute to an avoidance of such problems.

In a further aspect of the present invention, the flashlight may include variable focus through movement of the flashlight head toward and away from the flashlight barrel. The range of internal pressures can be maintained within limits ranging from a theoretical absolute vacuum to a maximum of ambient pressure experienced during assembly of the unit.

In more detailed aspects of the present invention, improved optical characteristics, including variable light dispersion as well as an ambient unfocused light source, are contemplated. An electrical switching function as well as variable focus through relative movement of the head and the barrel may also be provided. These features may also be achieved in a miniature hand-held flashlight of high quality construction.

Thus, it is an object of the present invention to provide an improved flashlight. Other and further objects and advantages will appear hereinafter.

BRIEF DESCRIPTION OF THE DRAWINGS

FIG. 1 is a perspective view of a miniature flashlight;

FIG. 2 is a partially foreshortened cross-sectional view of the miniature flashlight of FIG. 1 as taken through the plane indicated by 2—2;

FIG. 3 is a partial cross-sectional view of a forward end of the miniature flashlight, illustrating, in ghost image, a translation of the forward end of the flashlight;

FIG. 4 is a partial cross-sectional view of a lamp bulb holder assembly used in accordance with the present invention, taken along the plane indicated by 4—4 of FIG. 3;

FIG. 5 is an exploded perspective view illustrating the assembly of the lamp bulb holder assembly with respect to a barrel of the miniature flashlight;

FIG. 6 is an isolated partial perspective view illustrating the electro mechanical interface between electrical terminals of the lamp bulb and electrical conductors within the lamp bulb holder;

FIG. 7 presents a perspective view of a rearward surface of the lamp bulb holder of FIG. 5, illustrating a battery electrode contact terminal;

FIG. 8 illustrates an alternate utilization of the miniature flashlight;

FIG. 10 is a detailed cross-sectional plan of the end portion of the flashlight of FIG. 9;

FIG. 11 is a cross-sectional view of a one-way valve as employed in the flashlight of FIG. 9;

FIG. 12 is a simplified cross-sectional view taken along line 12—12 of FIG. 10;

FIG. 15 is a cross-sectional plan view of yet another flashlight employing one-way valves at various locations for illustrative purposes.

In the drawings, similar reference characters denote similar elements throughout the several views.

DETAILED DESCRIPTION OF A PREFERRED EMBODIMENT

Figure 9:
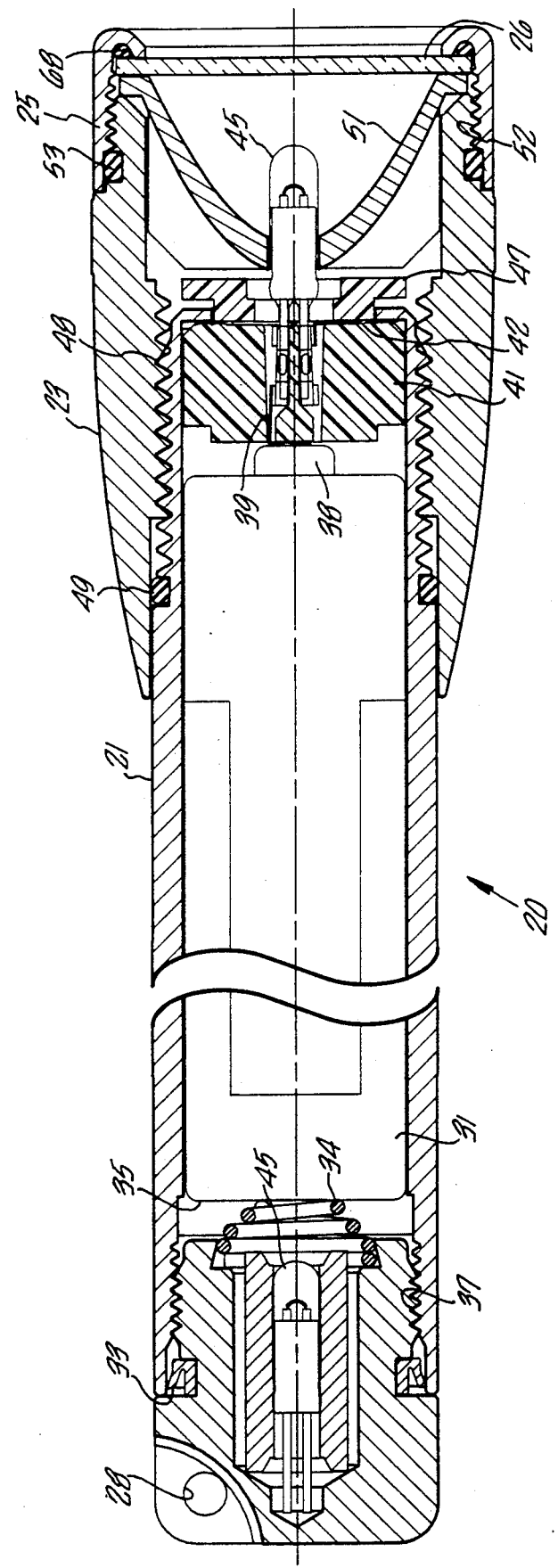
FIG. 9 illustrates a cross-sectional plan of a flashlight employing a one-way valve.

In overview, the preferred embodiments of the present invention are achieved by a miniature flashlight having a cylindrical tube containing one or more miniature dry cell batteries disposed in a series arrangement, a lamp bulb holder assembly including electrical conductors for making electrical contact between terminals of a miniature lamp held therein and the cylindrical tube and an electrode of the battery, respectively, retained in one end of the cylindrical tube adjacent the batteries, a tail cap and spring member enclosing the other end of the cylindrical tube and providing an electrical contact to the other electrode of the batteries, and a head assembly including a reflector, a lens, and a face cap, which head assembly is rotatably mounted to the cylindrical tube such that the lamp bulb extends through a hole in the center of the reflector within the lens. In the principle embodiment, the batteries are of the size commonly referred to as "pen light" batteries.

The head assembly engages threads formed on the exterior of the cylindrical tube such that rotation of the head assembly about the axis of the cylindrical tube will change the relative displacement between the lens and the lamp bulb. When the head assembly is fully rotated onto the cylindrical tube, the reflector pushes against the forward end of the lamp holder assembly causing it to shift rearwardly within the cylindrical tube against the urging of the spring contact at the tail cap. In this position, the electrical conductor within the lamp holder assembly which completes the electrical circuit from the lamp bulb to the cylindrical tube is not in contact with the tube. Upon rotation of the head assembly in a direction causing the head assembly to move forwardly with respect to the cylindrical tube, pressure on the forward surface of the lamp holder assembly from the reflector is relaxed enabling the spring contact in the tail cap to urge the batteries and the lamp holder assembly in a forward direction, which brings the electrical conductor into contact with the cylindrical tube, thereby completing the electrical circuit and causing the lamp bulb to illuminate. At this point, the lamp holder assembly engages a stop which prevents further forward motion of the lamp holder assembly with respect to the cylindrical tube. Continued rotation of the head assembly in a direction causing the head assembly to move forwardly relative to the cylindrical tube causes the reflector to move forwardly relative to the lamp bulb, thereby changing the focus of the reflector with respect to the lamp bulb, which results in varying the dispersion of the light beam admitted through the lens.

In certain embodiments, by rotating the head assembly until it disengages from the cylindrical tube, the head assembly may be placed, lens down, on a substantially horizontal surface and the tail cap and cylindrical tube may be vertically inserted therein to provide a miniature "table lamp."

Referring first to FIG. 1, a miniature flashlight in accordance with the present invention is illustrated in perspective, generally at 20. The miniature flashlight 20 is comprised of a generally right circular cylinder, or barrel 21, forming a battery housing and enclosed at a first end by a tail cap 22 and having a head assembly 23 enclosing a second end thereof. The head assembly comprises a head 24 to which is affixed a face or lens retainer cap 25 which retains a lens 26. The head assembly 23 has a diameter greater than that of the barrel 21 and is adapted to pass externally over the exterior of the barrel 21. The barrel 21 may provide a machined handle surface 27 along its axial extent. The tail cap 22 may be configured to include provision for attaching a handling lanyard through a hole 28 in a tab 29 formed therein.

Referring next to FIG. 2, the barrel 21 is seen to have an extent sufficient to enclose two miniature dry cell batteries 31 disposed in a series arrangement. The tail cap 22 has a region of external threading 32 which engages mating threads formed on the interior surface of the barrel 21. A sealing element 33, in the form of an O-ring or one-way valve, is provided at the interface between the tail cap 22 and the barrel 21 to provide a watertight seal. A spring member 34 is disposed within the barrel 21 so as to make electrical contact with the tail cap 22 and a case electrode 35 of an adjacent battery 31. The spring member 34 also urges the batteries 31 in a direction indicated by an arrow 36. A center electrode 37 of the rearmost battery 31 is in contact with the case electrode of the forward battery 31. The center electrode 38 of the forward battery is urged into contact with a first conductor 39 mounted within a lower insulator receptacle 41. The lower insulator receptacle 41 also has affixed therein a side contact conductor 42. Both the center conductor 39 and the side contact conductor 42 pass through holes formed in the lower insulator receptacle in an axial direction, and both are adapted to frictionally receive and retain the terminal electrodes 43 and 44 of a miniature bi-pin lamp bulb 45. Absent further assembly, the lower insulator receptacle is urged in the direction indicated by the arrow 36, by the action of the spring 34, to move until it comes into contact with a lip 46 formed on the end of the barrel 21. At that point electrical contact is made between the side contact conductor 42 and the lip 46 of the barrel 21.

An upper insulator receptacle 47 is disposed external to the end of the barrel 21 whereat the lower insulator receptacle 41 is installed. The upper insulator receptacle 47 has extensions that are configured to mate with the lower insulator receptacle 41 to maintain an appropriate spacing between opposing surfaces of the upper insulator receptacle 47 and the lower insulator receptacle 41. The lamp electrodes 43 and 44 of the lamp bulb 45 pass through the upper insulator receptacle 47 and into electrical contact with the center conductor 39 and the side contact conductor 42, respectively, while the casing of the lamp bulb 45 rests against an outer surface of the upper insulator receptacle 47.

The head assembly 23 is installed external to the barrel 21 by engaging threads 48 formed on an interior surface of the head 24 engaging with mating threads formed on the exterior surface of the barrel 21. A sealing element 49 is installed around the circumference of the barrel 21 adjacent the threads to provide a water-tight seal between the head assembly 23 and the barrel 21. A substantially parabolic reflector 51 is configured to be disposed within the outermost end of the head 24, whereat it is rigidly held in place by the lens 26 which is in turn retained by the face cap 25 which is threadably engaged with threads 52 formed on the forward portion of the outer diameter of the head 24. A sealing element 53 may be incorporated at the interface between the face cap 25 and the head 24 to provide a water-tight seal.

When the head 24 is fully screwed onto the barrel 21 by means of the threads 48, the central portion of the reflector 51 surrounding a hole formed therein for passage of the lamp bulb 45, is formed against the outermost surface of the upper insulator receptacle 47, urging it in a direction counter to that indicated by the arrow 36. The upper insulator receptacle 47 then pushes the lower insulator receptacle 41 in the same direction, thereby providing a space between the forward most surface of the lower insulator receptacle 41 and the lip 46 on the forward end of the barrel 21. The side contact conductor 42 is thus separated from contact with the lip 46 on the barrel 21 as is shown in FIG. 2.

Referring next to FIG. 3, appropriate rotation of the head 24 about the axis of the barrel 21 causes the head assembly 23 to move in the direction indicated by the arrow 36 through the engagement of the threads 48. Upon reaching the relative positions indicated in FIG. 3 by the solid lines, the head assembly 23 has progressed a sufficient distance in the direction of the arrow 36 such that the reflector 51 has also moved a like distance, enabling the upper insulator receptacle 47 and the lower insulator receptacle 41 to be moved, by the urging of the spring 34 (FIG. 2) translating the batteries 3 in the direction of the arrow 36, to the illustrated position. In this position, the side contact conductor 42 has been brought into contact with the lip 46 on the forward end of the barrel 21, which closes the electrical circuit.

Further rotation of the head assembly 23 so as to cause further translation of the head assembly 23 in the direction indicated by the arrow 36 will result in the head assembly 23 reaching a position indicated by the ghost image of FIG. 3, placing the face cap at the position 25' and the lens at the position indicated by 26', which in turn carries the reflector 51 to a position 51'. During this operation, the upper insulator receptacle 47 remains in a fixed position relative to the barrel 21. Thus the lamp bulb 45 also remains in a fixed position. The shifting of the reflector 51 relative to the lamp bulb 45 during this additional rotation of the head assembly 23 produces a relative shift in the position of the filament of the lamp bulb 45 with respect to a focus of the parabola of the reflector 51, thereby varying the dispersion of the light beam emanating from the lamp bulb 45 through the lens 26.

Referring next to FIG. 4, a partial cross-sectional view illustrates the interface between the lower insulator receptacle 41 and the upper insulator receptacle 47. The lower insulator receptacle 41 has a pair of parallel slots 54 formed therethrough which are enlarged in their center portion to receive the center conductor 39 and the side contact conductor 42, respectively. A pair of arcuate recesses 55 are formed in the lower insulator receptacle 41 and receive matching arcuate extensions of the upper insulator receptacle 47. The lower insulator receptacle 41 is movably contained within the inner diameter of the barrel 21 which is in turn, at the location of the illustrated cross-section, enclosed within the head 24.

Referring next to FIGS. 5 through 7, a preferred procedure for the assembly of the lower insulator receptacle 41, the center conductor 39, the side contact conductor 42, the upper insulator receptacle 47 and the miniature lamp bulb 45 may be described. Placing the lower insulator receptacle 41 in a position such that the arcuate recesses 55 are directionally oriented towards the forward end of the barrel 21 and the lip 46, the center conductor 39 is inserted through one of the slots 54 such that a substantially circular end section 56 extends outwardly from the rear surface of the lower insulator receptacle 41. The circular end section 56 is then bent, as shown in FIG. 7, to be parallel with the rearmost surface of the lower insulator receptacle 41 in a position centered to match the center electrode of the forwardmost one of the batteries 31 of FIG. 2. The side contact conductor 42 is then inserted into the other slot 54 such that a radial projection 57 extends outwardly from the axial center of the lower insulator receptacle 41. It is to be noted that the radial projection 57 aligns with a web 58 between the two arcuate recesses 55.

The lower insulator receptacle 41, with its assembled conductors, is then inserted in the rearward end of the barrel 21 and is slidably translated to a forward position immediately adjacent the lip 46. The lamp electrodes 43 and 44 are then passed through a pair of holes 59 formed through the forward surface of the upper insulator receptacle 47 so that they project outwardly from the rear surface thereof as illustrated in FIG. 6. The upper insulator receptacle 47, containing the lamp bulb 45, is then translated such that the lamp electrodes 43 and 44 align with receiving portions of the side contact conductor 42 and the center conductor 39, respectively. A pair of notches 61, formed in the upper insulator receptacle 47, are thus aligned with the webs 58 of the lower insulator receptacle 41. The upper insulator receptacle 47 is then inserted into the arcuate recesses 55 in the lower insulator receptacle 41 through the forward end of the barrel 21.

Referring again to FIGS. 2 and 3, the electrical circuit of the miniature flashlight in accordance with the present invention will now be described. Electrical energy is conducted from the rearmost battery 31 through its center contact 37 which is in contact with the case electrode of the forward battery 31. Electrical energy is then conducted from the forward battery 31 through its center electrode 38 to the center contact 39 which is coupled to the lamp electrode 44. After passing through the lamp bulb 45, the electrical energy emerges through the lamp electrode 43 which is coupled to the side contact conductor 42. When the head assembly 23 has been rotated about the threads 48 to the position illustrated in FIG. 2, the side contact conductor 42 does not contact the lip 46 of the barrel 21, thereby resulting in an open electrical circuit. However, when the head assembly 23 has been rotated about the threads 48 to the position illustrated by the solid lies of FIG. 3, the side contact conductor 42 is pressed against the lip 46 by the lower insulator receptacle 41 being urged in the direction of the arrow 36 by the spring 34 of FIG. 2. In this configuration, electrical energy may then flow from the side contact conductor 42 into the lip 46, through the barrel 21 and into the tail cap 22 of FIG. 2. The spring 34 electrically couples the tail cap 22 to the case electrode 35 of the rearmost battery 31. By rotating the head assembly 23 about the threads 48 such that the head assembly 23 moves in a direction counter to that indicated by the arrow 36, the head assembly 23 may be restored to the position illustrated in FIG. 2, thereby opening the electrical circuit and turning off the flashlight.

Referring next to FIG. 8, an additional utilization of the miniature flashlight 20 in accordance with the present invention is illustrated. By rotating the head assembly 23 about the threads 48 in a direction causing the head assembly 23 to translate relative to the barrel 21 in the direction of the arrow 36 of FIG. 3, the electrical circuit will be closed as previously described, and the lamp bulb 45 will be illuminated. Continued rotation of the head assembly 23 in that direction enables the head assembly 23 to be completely removed from the forward end of the miniature flashlight 20. By placing the head assembly 23 upon a substantially horizontal surface (not illustrated) such that the face cap 25 rests on the surface, the tail cap 22 of the miniature flashlight 20 may be inserted into the head 24 to hold the barrel 21 in a substantially vertical alignment. Since the reflector 51 (FIG. 2) is located within the head assembly 23, the lamp bulb 45 will omit a substantially spherical illumination, thereby providing an "ambient" light level.

In a preferred embodiment, the barrel 21, the tail cap 22, the head 24, and the face cap 25, forming all of the exterior metal surfaces of the miniature flashlight 20 are manufactured from aircraft quality, heat-treated aluminum, which is anodized for corrosion resistance. The sealing elements 33, 49, and 53 provide atmospheric sealing of the interior of the miniature flashlight 20 which may be to a water depth of 200 feet. All interior electrical contact surfaces are appropriately machined to provide efficient electrical conduction. The reflector 51 is a computer generated parabola which is vacuum aluminum metallized to ensure high precision optics. The threads 48 between the head 24 and the barrel 21 are machined such that revolution of the head assembly 23 through less than ¼ turn will close the electrical circuit, turning the flashlight on, and an additional ¼ turn will adjust the light beam from a "spot" to a "soft flood". A spare lamp bulb 45 may be provided in a cavity machined in the tail cap 22.

Turning to FIGS. 9 through 12, a further preferred embodiment is illustrated. Similar numerals define similar components to those referenced in earlier figures. Of note is a plastic insert positioned in the tail cap 22. This plastic insert surrounds the spare bulb 45 for retention thereof. Looking in greater detail to the seal 33 between the tail cap 22 and the barrel 21, a one-way valve 62 is presented in a circumferential channel 63 within the tail cap 22. A cylindrical inner surface 64 provided on the barrel 21 cooperates with the one-way valve 62. The one-way valve 62 is provided by a lip seal having a flexible flange 65 which is sized to compress against the cylindrical inner surface 64 of the barrel 21. As the flexible flange 65 is inclined away from the interior volume of the flashlight, it is oriented to prevent flow from outside into the interior of the flashlight and yet allows overpresure within the flashlight to escape. To insure passage of overpressure gases from the interior volume of the flashlight, a passage is to exist across the one-way valve 62. In the embodiment illustrated most clearly in FIG. 10, the interior threads 66 of the barrel 21 have a flattened top, thus creating a spiral passage through the mating threads between the barrel 21 and the tail cap 22. Additionally, radial splines 67 are formed in the tail cap 22 as illustrated in FIG. 12. These insure multiple paths so that the very end of the barrel 21 does not seal against the associated flange of the tail cap 22 to prevent one-way flow of overpressure gases from the interior of the flashlight.

Figure 13:
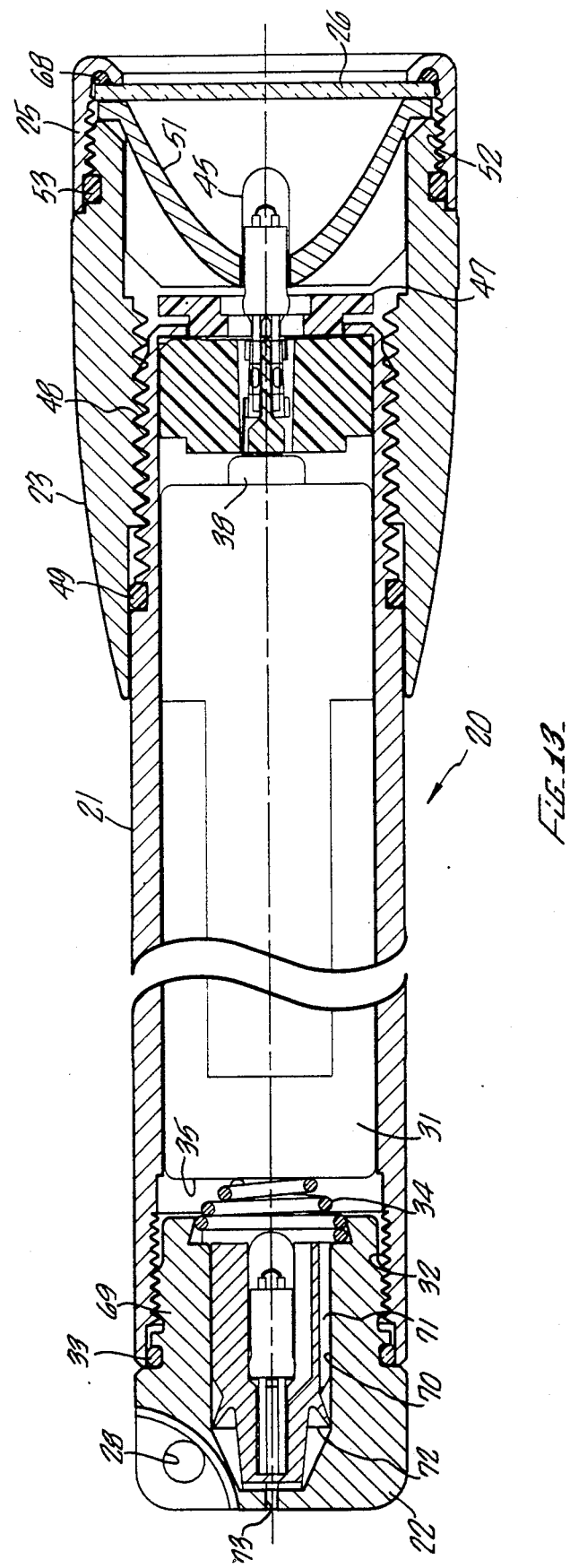
FIG. 13 is a cross-sectional plan view of a flashlight having a second embodiment of a one-way valve located in the tail cap of the flashlight.

A further embodiment is illustrated in FIG. 13. This embodiment is substantially like that of FIGS. 9 through 12 with the exception that all of the seals 33, 49, 53 and 68 are simple O-rings. To form a one-way valve, an insert 69 is positioned within a cylindrical cavity 70. The insert 69 is similar to that otherwise employed to receive the spare bulb 45. Longitudinal channels 71 extend along the body of the insert 69. Circumferentially placed about the insert 69 is an integral lip seal defined by a flexible flange 72. This flexible flange 72 extends toward the rear of the tail cap 22 such that air passing through the channels 71 may force the flexible flange 72 inwardly to release overpressure within the interior volume of the flashlight. A hole 73 provides a through passage through the end of the tail cap 22 such that a passage is created from the interior volume and controlled by the one-way valve defined by the flexible flange 72.

Figure 14:
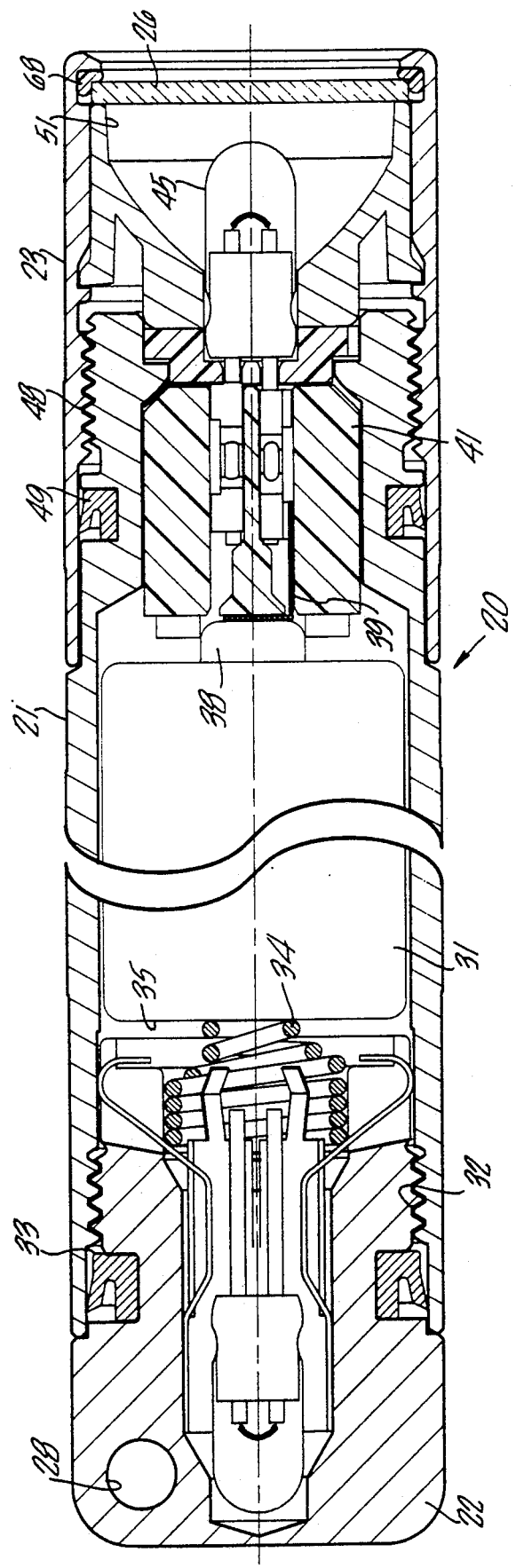
FIG. 14 is another flashlight employing one-way valves illustrated in cross-sectional plan.

A further embodiment of the present invention is illustrated in FIG. 14. It may be noted that both the seal 33 and the seal 49 include one-way valves. The head assembly is also differently configured and this flashlight is contemplated to use a single cell and be even further miniaturized over the other embodiments. Structural details not common to the other described embodiments are similar to those found in U.S. Pat. No. 4,864,474, the disclosure of which is incorporated herein by reference.

FIG. 15 illustrates yet another embodiment which one-way valves illustrated at seals 33, 49 and 53. It is contemplated that only one such seal would be necessary and any one or more of these locations might prove sufficient. It may also be noted in FIG. 15 that the seal 49 is positioned within a channel located in the head assembly 23 rather than in the wall of the barrel 21.

Accordingly, improved high quality miniature flashlights are presented in the foregoing disclosure. While described preferred embodiments of the herein invention have been described, numerous modifications, alterations, alternate embodiments, and alternate materials may be contemplated by those skilled in the art and may be utilized in accomplishing the present invention. It is envisioned that all such alternate embodiments are considered to be within the scope of the present invention as defined by the appended claims.

What is claimed is:

1. A flashlight comprising
   a battery housing having a first opening;
   a lamp bulb;
   an electrical circuit extending from said battery housing to said lamp bulb;
   a lens positioned adjacent said lamp bulb;
   a reflector positioned about said lamp bulb to reflect light through said lens;
   a closure for said first opening of said battery housing, said battery housing and said closure forming a closed internal volume having a passage extending to atmosphere from said closed internal volume;
   a one-way valve in said passage oriented to permit gas flow from said closed internal volume to atmosphere.

2. The flashlight of claim 1 wherein said closure is a tail cap mounted by threads to said battery housing.

3. The flashlight of claim 1 wherein said closure is a head mounted by threads to said battery housing, said lens and said reflector being mounted in said head.

4. The flashlight of claim 1 wherein said closure is a lens retainer cap.

5. The flashlight of claim 1 wherein said passage is between said closure and said battery housing.

6. The flashlight of claim 5 wherein said battery housing and said closure have mating threads, said passage extending between said mating threads.

7. The flashlight of claim 5 wherein said one-way valve is a seal ring having a flexible flange extending to seal against a side of said passage and inclined away from said internal volume in said passage.

8. A flashlight comprising
   a battery housing having a first opening;
   a head closing said first opening of said battery housing and moveable toward and away from said housing, said battery housing and said head forming a closed internal volume having a passage extending to atmosphere from said closed internal volume, said closed internal volume expanding and contracting with movement of said head;
   a lamp bulb;
   an electrical circuit extending from said battery housing to said lamp bulb;
   a lens fixed in said head and positioned adjacent said lamp bulb;
   a reflector fixed in said head and positioned about said lamp bulb to reflect light through said lens;
   a one-way valve in said passage oriented to permit gas flow from said closed internal volume to atmosphere.

9. The flashlight of claim 8 wherein said head is mounted by threads to said battery housing and said lamp bulb is mounted to said battery housing whereby rotation of said head moves said reflector relative to said lamp bulb.

10. The flashlight of claim 8 wherein said electrical circuit includes battery contacts and a switch between said lamp bulb and a said battery contact whereby rotation of said head selectively activates said switch.

11. A flashlight comprising
    a battery housing having a first opening and a second opening;
    a head closing said first opening of said battery housing, said head and said battery housing having first mating threads, said head being moveable toward and away from said housing;
    an tail cap closing said second opening, said tail cap and said battery housing having second mating threads, said battery housing, said head and said end cap forming a closed internal volume having a passage extending to atmosphere from said closed internal volume, said closed battery chamber expanding and contracting with movement of said head, said passage extending between one of said first and second mating threads;
    a lamp bulb;
    an electrical circuit extending from said battery housing to said lamp bulb;
    a lens fixed in said head and positioned adjacent said lamp bulb;
    a reflector fixed in said head and positioned about said lamp bulb to reflect light through said lens;
    a one-way valve in said passage oriented to permit gas flow from said closed internal volume to atmosphere, said one-way valve being a seal ring having a flexible flange extending to seal against a side of said passage and inclined away from said internal volume in said passage.

12. A flashlight comprising
    a battery housing having a first opening;
    a lamp bulb;
    an electrical circuit extending from said battery housing to said lamp bulb;
    a lens positioned adjacent said lamp bulb;
    a reflector positioned about said lamp bulb to reflect light through said lens;
    a closure for said first opening of said battery housing; said battery housing and said closure forming a closed internal volume having a passageway between said closure and said battery housing extending to atmosphere from said closed internal volume;
    a one-way valve in said passage oriented to permit gas flow from said closed internal volume to atmosphere, said one-way valve being a seal ring having a flexible flange extending to seal against a side of said passage and inclined away from said internal volume in said passage.

13. The flashlight of claim 12 wherein said passage has multiple paths from said one-way valve to atmosphere.

14. The flashlight of claim 13 wherein said closure is a tail cap mounted by threads to said battery housing, said passage extending through said threads.

15. The flashlight of claim 14 wherein said multiple paths include radially extending splines between said tail cap and said battery housing.

* * * * *